(12) United States Patent
Baldwin et al.

(10) Patent No.: US 11,114,873 B2
(45) Date of Patent: Sep. 7, 2021

(54) CONTINGENCY BATTERY CHARGING SYSTEM

(71) Applicant: Walmart Apollo, LLC, Bentonville, AR (US)

(72) Inventors: Micah Baldwin, Bella Vista, AR (US); Mitchell Barnett, Hamden, OH (US)

(73) Assignee: Walmart Apollo, LLC, Bentonville, AR (US)

( * ) Notice: Subject to any disclaimer, the term of this patent is extended or adjusted under 35 U.S.C. 154(b) by 285 days.

(21) Appl. No.: 16/366,389

(22) Filed: Mar. 27, 2019

(65) Prior Publication Data

US 2019/0305570 A1    Oct. 3, 2019

Related U.S. Application Data

(60) Provisional application No. 62/652,096, filed on Apr. 3, 2018.

(51) Int. Cl.
*H02J 7/00* (2006.01)
*H02J 7/14* (2006.01)
(Continued)

(52) U.S. Cl.
CPC ............ *H02J 7/0045* (2013.01); *B60L 1/006* (2013.01); *B60L 53/80* (2019.02); *H01M 10/06* (2013.01);
(Continued)

(58) Field of Classification Search
CPC ........ H02J 7/0045; H02J 7/342; H02J 7/1423; H01M 50/20; H01M 10/06;
(Continued)

(56) References Cited

U.S. PATENT DOCUMENTS 2,703,871 A     3/1955  Woodhead, Jr.
4,413,219 A *  11/1983  Ducharme ............ H01M 50/20
                                                         320/109
(Continued)

FOREIGN PATENT DOCUMENTS

CN       202272088 U      6/2012
EP        1930218 A2 *    6/2008   .......... F15B 13/0814
(Continued)

OTHER PUBLICATIONS

Copenheaver, Blaine R., International Search Report, International Application No. PCT/US19/24315, dated Jun. 11, 2019, 2 pages.
(Continued)

*Primary Examiner* — M Baye Diao

(57) ABSTRACT

The system and method described herein provide a contingency battery charging system that can be deployed on demand to a location in need of an alternate power system to power industrial vehicles (such as forklifts or other industrial vehicles used in a transportation and distribution operation). The contingency battery charging system can be transported from a centrally-located standby location to support a fleet of industrial vehicles at a deployment location. The contingency battery charging system may include a truck trailer that is wired to facilitate quick deployment of one or more transportable battery charging stations. Each transportable battery charging station may include at least one battery charger capable of concurrently charging multiple lead-acid batteries for use in industrial vehicles.

18 Claims, 6 Drawing Sheets

(51) Int. Cl.
  *B60L 1/00* (2006.01)
  *H01M 10/06* (2006.01)
  *B60L 53/80* (2019.01)
  *H01M 50/20* (2021.01)

(52) U.S. Cl.
  CPC ............ *H01M 50/20* (2021.01); *H02J 7/1423* (2013.01); *H01M 2220/20* (2013.01)

(58) Field of Classification Search
  CPC .............. H01M 2220/20; Y02T 90/12; Y02T 10/7072; Y02T 10/92; Y02T 10/70; Y02E 60/10; B60L 53/50; B60L 1/006; B60L 53/80
  USPC ......................................................... 320/109
  See application file for complete search history.

(56) References Cited

U.S. PATENT DOCUMENTS

| | | |
|---|---|---|
| 6,938,400 B2 | 9/2005 | Fillman et al. |
| 7,207,405 B2 | 4/2007 | Reid et al. |
| 7,688,027 B2 | 3/2010 | Kaji et al. |
| 7,730,981 B2 | 6/2010 | McCabe et al. |
| 8,203,310 B2 | 6/2012 | McCabe |
| 8,212,142 B2 | 7/2012 | Lyman et al. |
| 8,256,553 B2 * | 9/2012 | De Paschoal ............ B60G 3/20 180/68.5 |
| 8,299,645 B2 | 10/2012 | Muchow et al. |
| 9,321,361 B2 | 4/2016 | Kamen et al. |
| 9,776,326 B2 * | 10/2017 | Zevenbergen ......... B25J 9/1664 |
| 10,829,351 B2 * | 11/2020 | Wild .................... B66F 9/07531 |
| 2005/0058891 A1 | 3/2005 | Marraffia |
| 2005/0181284 A1 * | 8/2005 | Culpin ................. H01M 50/431 429/247 |
| 2006/0028171 A1 | 2/2006 | Marraffia |
| 2014/0285005 A1 * | 9/2014 | Casteel ................... H02S 10/20 307/23 |
| 2016/0240852 A1 * | 8/2016 | Yamauchi ............... H01M 4/14 |
| 2017/0346322 A1 * | 11/2017 | Kuran ................... H02J 7/0031 |
| 2019/0103639 A1 * | 4/2019 | Guglielmo .......... H01M 10/425 |
| 2019/0224852 A1 * | 7/2019 | Choi .......................... H02J 7/00 |
| 2021/0052443 A1 * | 2/2021 | Tu ............................. A61G 3/02 |

FOREIGN PATENT DOCUMENTS

| | | | | |
|---|---|---|---|---|
| JP | 2000071906 A | * | 3/2000 | ............ Y02E 10/50 |
| WO | 2015149138 A1 | | 10/2015 | |

OTHER PUBLICATIONS

Copenheaver, Blaine R., "Written Opinion", International Application No. PCT/US19/24315, dated Jun. 11, 2019, 7 pages.

* cited by examiner

CONTINGENCY BATTERY CHARGING SYSTEM

BACKGROUND

This disclosure relates to the field of electrical systems, and more particularly to an alternate power solution for powering industrial lift trucks or other industrial vehicles. Current techniques for transportation and distribution of materials (such as goods, industrial items, construction materials, or other items) rely on industrial vehicles to move bulky items. For example, an industrial vehicle (such as forklifts, lift trucks, side loaders, reach trucks, pallet trucks, flatbed vehicles, and the like) may be used to move pallets or other bundles of items from one location to another location within a distribution center or warehouse. An industrial vehicle also may be used for loading and unloading materials into a transport vehicle (such as a truck, train, ship, plane, or the like). Industrial vehicles may be powered by different types of electrical power systems (such as fuel cells or batteries). A fuel cell vehicle may convert chemical energy from a fuel (such as hydrogen gas) into electricity through an electrochemical reaction. In some environments, the use of fuel cells may be preferred when the hydrogen fuel is available. However, when the hydrogen fuel becomes depleted, the industrial vehicle may cease to operate unless the hydrogen fuel is replenished. If the hydrogen fuel becomes unavailable (such as due to a disruption in fuel supply or other exigent circumstance), there is a risk of disrupting the transportation and distribution operations. A transportation and distribution operation may benefit from a contingency plan for providing an alternate power system to power the industrial vehicles.

SUMMARY

This Summary is provided to introduce a selection of concepts (in a simplified form) that is further described below in the Detailed Description. This Summary is not intended to identify key features or essential features of the claimed subject matter, nor is it intended to be used as an aid in determining the scope of the claimed subject matter.

This disclosure provides a contingency battery charging system and method for using the contingency battery charging system. The contingency battery charging system can be deployed on demand to a location in need of an alternate power systems for industrial vehicles. The contingency battery charging system can be transported from a centrally-located standby location to support a fleet of industrial vehicles at a deployment location. The contingency battery charging system may include a truck trailer to store and transport one or more transportable battery charging stations. The truck trailer may be wired to facilitate a quick connection between a power source and the transportable battery charging stations. Each transportable battery charging station may include at least one battery charger capable of concurrently charging multiple lead-acid batteries for use in industrial vehicles.

One innovative aspect of the subject matter described in this disclosure can be implemented as a transportable battery charging station. The transportable battery charging station may include one or more battery chargers capable of charging a plurality of lead-acid batteries. The transportable battery charging station may include a plurality of battery stands. The transportable battery charging station may include a rack structure for mounting and wiring the one or more battery chargers to the plurality of battery stands. The rack structure may be constructed to fit in a transportation container or truck trailer for transportation from a standby location to a deployment location.

In some implementations, the rack structure may be constructed with a stable base that forms a space for an industrial vehicle to lift and move the rack structure.

In some implementations, the transportable battery charging station may be capable of concurrently charging multiple lead-acid batteries.

Another innovative aspect of the subject matter described in this disclosure can be implemented as a system for deploying contingency battery power. The system may include a first truck trailer for transportation of at least a first transportable battery charging station. The first transportable battery charging station may have one or more battery chargers mounted to a rack structure constructed to fit in the first truck trailer for transportation from a standby location to a deployment location. The system may include at least a first fixed connector incorporated into the first truck trailer for connecting a power source to a power distribution system of the first truck trailer. The system may include at least a second fixed connector incorporated into the first truck trailer for connecting the power distribution system to the one or more battery chargers of the first transportable battery charging station.

In some implementations, the first fixed connector may include an exterior mounted turn-locking connector for connection to an electric power generator outside the first truck trailer.

In some implementations, the system may include multiple transportable battery charging stations. The multiple transportable battery charging stations may be capable of concurrently charging multiple lead-acid batteries.

In some implementations, the system may include a second truck trailer for transportation of additional transportable battery charging stations.

Another innovative aspect of the subject matter described in this disclosure can be implemented as a contingency battery charging system. The contingency battery charging system may include a plurality of trailers for transporting multiple transportable battery charging stations from a standby location to a deployment location. Each trailer of the plurality of trailers may be equipped with a first fixed connector electrically coupled to wiring inside each trailer. The wiring inside each trailer may be electrically coupled to one or more power output connectors at a dock side portion of each trailer. The contingency battery charging system may include the multiple transportable battery charging stations. Each transportable battery charging station may have one or more battery chargers and a plurality of battery stands mounted to a rack structure. The one or more battery chargers may be capable of charging lead-acid batteries. The contingency battery charging system may include a generator trailer for transporting a generator from the standby location to the deployment location. The contingency battery charging system may include power cables to connect the generator to the first fixed connector on each trailer of the plurality of trailers. The contingency battery charging system may include power cables to connect the multiple transportable battery charging stations to the second fixed connector on each trailer of the plurality of trailers. The contingency battery charging system may include charging cables to connect the lead-acid batteries to the one or more battery chargers. The contingency battery charging system may include a battery puller adapter configured to facilitate changing fuel cells in a fleet of industrial vehicles with the lead-acid batteries.

In some implementations, the contingency battery charging system may include multiple lead-acid batteries for use in the fleet of industrial vehicles. The multiple lead-acid batteries may be transported to the deployment location in one or more of the following: the plurality of trailers, the generator trailer, another trailer, or a transportation vehicle.

Another innovative aspect of the subject matter described in this disclosure can be implemented as a method for providing contingency battery power. The method may include preparing at least a first transportable battery charging station having one or more battery chargers mounted to a rack structure constructed to fit in a truck trailer for transportation from a standby location to a deployment location. The method may include transporting the first transportable battery charging station from the standby location to the deployment location in the truck trailer. The method may include connecting the first transportable battery charging station to a generator at the deployment location. The method may include charging a plurality of lead-acid batteries for use in one or more industrial vehicles at the deployment location. The method may include replacing a first battery of an industrial vehicle with one of the plurality of lead-acid batteries charged by the first transportable battery charging station.

Another innovative aspect of the subject matter described in this disclosure can be implemented as a method for providing contingency battery power. The method may include deploying a contingency battery charging system to a deployment location. The contingency battery charging system may include a plurality of trailers containing multiple transportable battery charging stations and a generator trailer containing a generator. The method may include connecting the generator to each of the plurality of trailers. Each trailer of the plurality of trailers may be equipped with a first fixed connector electrically coupled to wiring inside each trailer. The wiring inside each trailer may be electrically coupled to one or more power output connectors at a dock side portion of each trailer. The method may include connecting the multiple transportable battery charging stations to the one or more power output connectors at the dock side portion of each trailer. The method may include charging multiple lead-acid batteries using the multiple transportable battery charging stations. The method may include using the multiple lead-acid batteries as an alternate power system in a fleet of industrial vehicles at the deployment location.

Details of one or more implementations of the subject matter described in this disclosure are set forth in the accompanying drawings and the description below. Other features, aspects, and advantages will become apparent from the description, the drawings, and the claims.

BRIEF DESCRIPTION OF THE DRAWINGS

The present description will be better understood from the following detailed description read in light of the accompanying drawings.

Corresponding reference characters indicate corresponding parts throughout the drawings. The systems depicted in the figures are illustrated as schematic drawings. Note that the relative dimensions of the figures may not be drawn to scale.

DETAILED DESCRIPTION

Figure 1:
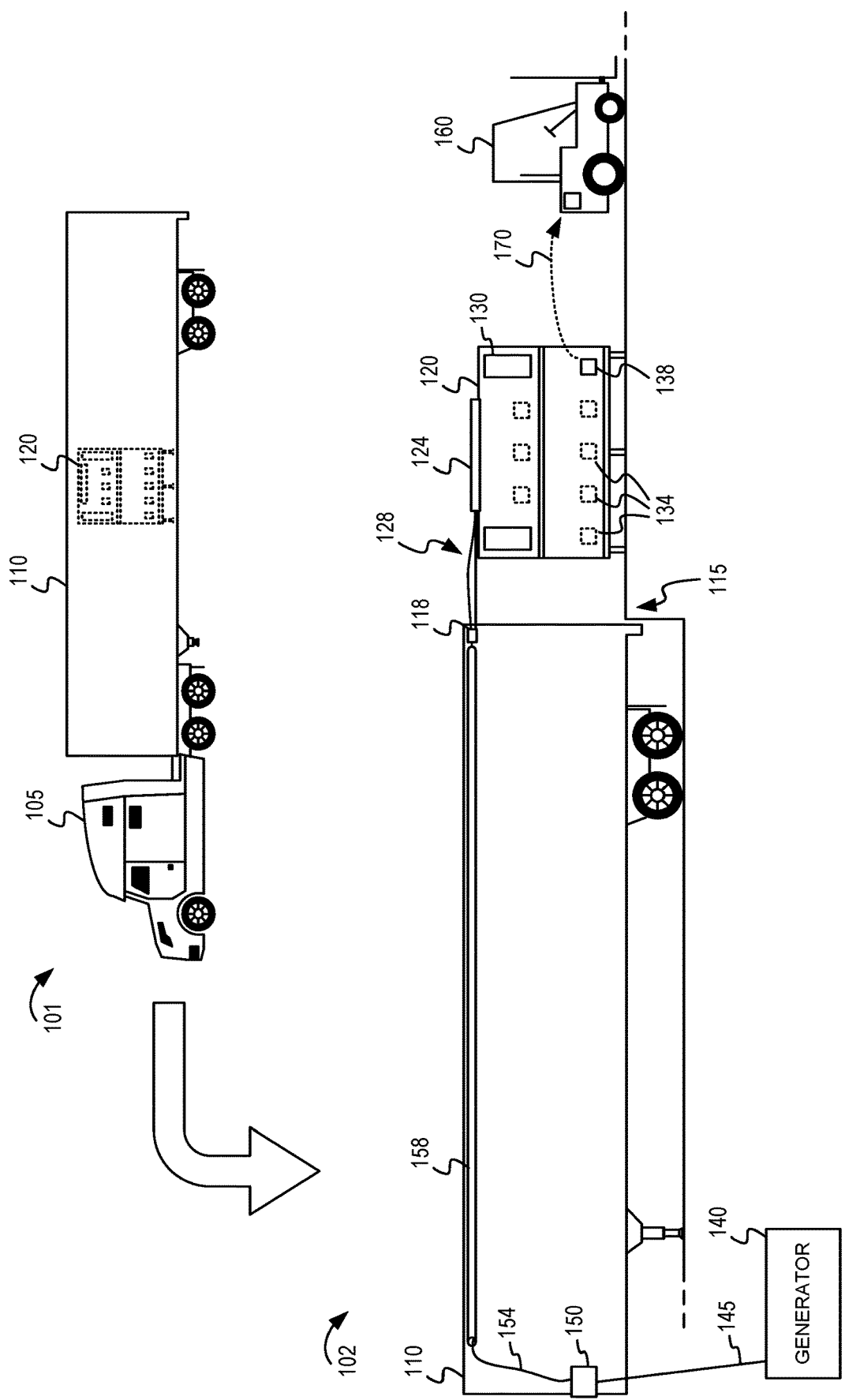
FIG. 1 depicts an example system diagram with example features of a contingency battery charging system.

The systems and methods described herein are related to a contingency battery charging system that can be deployed as an alternate power system to temporarily replace fuel cell power systems in industrial vehicles. For example, consider a scenario in which a fleet of industrial vehicles are used in a transportation and distribution operation. The fleet of industrial vehicles may be powered by fuel cells. In the example scenario, the fuel cells store hydrogen gas which can be converted into electricity through an electrochemical reaction. However, there may be a temporary disruption in the supply of hydrogen gas to the location where the fleet of industrial vehicles is being used. To prevent a disruption in the transportation and distribution operation, the fuel cell power systems may be temporarily replaced by lead-acid batteries. However, purchasing redundant lead-acid batteries for every industrial vehicle may not be cost-effective. For example, there may be a large quantity of industrial vehicles in a location or multiple potential locations in which fleets of industrial vehicles are used. Thus, it may not be practical to maintain redundant battery systems for every industrial vehicle at every location of a transportation and distribution operation.

In accordance with this disclosure, a contingency battery charging system may include one or more transportable battery charging stations. The transportable battery charging stations may be deployed from a standby location (such as a headquarters or regional center) to a deployment location where industrial vehicles are temporarily in need of alternate power systems. The transportable battery charging stations (which also may be referred to as a pod or rack system) may be preconfigured with a rack structure to mount one or more battery chargers. The battery charger(s) may be capable of currently charging many lead-acid batteries. A truck trailer may be used to transport the transportable battery charging stations to the deployment location. The examples in this disclosure refer to the use of a truck trailer, however other types of transportation means may be used, including transportation containers used on railroads, ships, planes, or the like.

In one aspect of this disclosure, the truck trailer and the transportable battery charging stations are preconfigured to facilitate deployment of the battery chargers. In some implementations, in addition to transporting the transportable battery charging stations to a deployment location, the truck trailer also may integrate electrical components to bridge a power source to the transportable battery charging stations. For example, the truck trailer may incorporate any combination of fixed connectors (such as turn-locking connectors or quick connectors), circuit breakers, distribution power systems, or cabling accessories to enable easier or faster connection of a power source to the transportable battery charging stations, and vice versa. The power source may be an electric power generator (which may be referred to as a generator in this disclosure) or another type of power source. The truck trailer also may transport a battery changing apparatus (which may be referred to as a battery puller) to facilitate changing batteries in an industrial vehicle at the deployment location.

In one aspect of this disclosure, deployment of transportable battery charging stations may be performed in response to an ad-hoc or temporary emergency basis. By maintaining pre-configured transportable battery charging stations at a standby location, a transportation and distribution operation may be capable of providing alternate power systems to multiple potential deployment locations. For example, a centrally-located collection of transportable battery charging stations (and, optionally, transportable generators) may be maintained for potential use at various transportation and distribution locations.

Particular implementations of the subject matter described in this disclosure can be implemented to realize one or more of the following potential advantages. A centrally-located collection of transportable battery charging stations may be more cost-effective than maintaining battery charging stations at every potential deployment location. The design of the transportable battery charging stations and truck trailer may facilitate quick deployment of an alternate power system for industrial vehicles that may otherwise be inoperable due to a disruption in the supply of hydrogen gas for fuel cells. The contingency battery charging system may support the adoption of fuel cell power systems in the industrial vehicles used by a transportation and distribution operation while mitigating the risk of a disruption in the supply of hydrogen fuel.

FIG. 1 depicts an example system diagram with example features of a contingency battery charging system. The example system shows a transportable battery charging station 120 and a truck trailer 110. In this example, a single transportable battery charging station 120 is described. However, as described in FIGS. 3 and 4, a truck trailer 110 may carry multiple transportable battery charging stations. Before deployment (shown at arrow 101), the transportable battery charging station 120 may be pre-configured and stored in the truck trailer 110. For example, the truck trailer 110 and the transportable battery charging station 120 may be stored at a centrally-located standby location. The process of deploying the transportable battery charging station 120 may include transporting the truck trailer 110 to a deployment location. In the example of FIG. 1, a truck 105 may transport the truck trailer 110 (and the transportable battery charging station 120) to the deployment location. In some implementations, another type of transport vehicle or transportation container may be substituted for the truck 105 and the truck trailer 110, respectively.

At arrow 102, the truck trailer 110 is positioned at a dock 115 of a deployment location. Deployment may include unloading the transportable battery charging station 120 from the truck trailer 110. The transportable battery charging station 120 includes one or more battery chargers (such as battery charger 130) which are mounted to a rack structure. The battery chargers are capable of concurrently charging multiple lead-acid batteries (such as lead-acid batteries 134 and 138). The components and features of the transportable battery charging station 120 are further described in detail in FIG. 2. The transportable battery charging station 120 may be constructed with a rack structure that can be moved to a staging area of the deployment location. For example, the base (which may be constructed using any combination of uprights, feet, base plates, adjustable stands, or the like) of the rack structure may provide a stable base as well as clearance space for the forks of a forklift to maneuver under the rack structure. A forklift may be used to unload the transportable battery charging station 120 from the truck trailer 110.

Once the transportable battery charging station 120 is unloaded from the truck trailer 110, the battery charger 130 will be connected to a power source that supplies power to the battery charger 130. In FIG. 1, the power source is an external electric power generator (generator 140). In some implementations, the generator 140 may be transported in the truck trailer 110 with the transportable battery charging station 120. In some implementations, the generator 140 may be transported in another truck trailer (not shown) to the deployment location as part of a coordinated deployment of the contingency battery charging system. In yet another implementation, the generator 140 may be a large power system that is towed by another truck (not shown) and delivered to the deployment location on demand. In other examples, other types of power sources (including, but not limited to, a connection to a power grid, a hydroelectric power plant, a wind power generation plant, or the like). The generator 140 may be a gasoline-powered generator (or diesel-powered generator) which may be useful when a catastrophic emergency has disrupted other power sources. The truck trailer 110 may be preconfigured with connectors to facilitate interconnection between the generator 140 and the transportable battery charging station 120. For example, a first fixed connector 150 may be incorporated into the truck trailer 110. A high-voltage power cable from the generator 140 to the first fixed connector 150 may be implemented over a relatively short distance. The first fixed connector 150 may be positioned in a variety of locations. As shown in FIG. 1, the first fixed connector 150 may be incorporated into a front portion (such as "nose") of the truck trailer 110. The position of the first fixed connector 150 at the front portion may facilitate a connection to the generator 140 while minimizing the amount of cabling that would be present on the dock 115 or other area of the deployment location.

Inside the truck trailer 110, one or more power cables (such as power cable 154) may be pre-wired to a second fixed connector 118 incorporated into the back of the truck trailer 110. Having the power cables inside the length of the truck trailer 110 may reduce clutter on the dock 115, conserve floor space at the deployment location, or improve safety for workers at the deployment location. A cable tray, conduit, or other cable management system 158 may organize the power cables from the first fixed connector 150 to the second fixed connector 118. In some implementations, the truck trailer 110 also may have a circuit breaker (not shown) to protect the battery charger 130 from unintended power surges or overloading. In some implementations, a power distribution system (not shown) may be used in the truck trailer 110 to distribute power to multiple power chargers (such as the battery charger 130). A power cable 128 from the second fixed connector 118 to the transportable battery charging station 120 may supply the power to the battery charger 130. In some implementations, a power distribution panel 124 may be incorporated into the transportable battery charging station 120. Alternatively, the power distribution panel 124 may be incorporated into the truck trailer 110. The power distribution panel 124 may facilitate quick connection of power cables from the one or more battery chargers in the transportable battery charging station 120 to the power supply via the truck trailer 110. In some implementations, the first fixed connector 150 and the second fixed connector 118 may be turn-locking power receptacles.

The battery charger 130 may charge multiple lead-acid batteries (such as lead-acid batteries 134 and 138). FIG. 1 shows an industrial vehicle (forklift 160). Although the forklift 160 is depicted as a human-operated industrial vehicle, other types of industrial vehicles (including automated or computer-operated machines) may be used with the lead-acid batteries as an alternate to fuel cells. In the example of FIG. 1, the forklift 160 may be a fuel cell vehicle which is running low on hydrogen fuel without the ability to replenish the hydrogen fuel. The fuel cell power system may be replaced (shown by arrow 170) by the lead-acid batteries 138. The use of a battery changing apparatus (not shown) may assist the changing of a battery in an industrial vehicle. For example, a first industrial vehicle (such as a pallet jack) may be equipped with a battery puller adapter (ABP). The ABP can assist with maneuvering, height adjustment, and power for a powered arm and extraction system used to install the lead-acid battery into another industrial vehicle. In some implementations, the ABP (not shown) may be transported with the transportable battery charging station 120 on the truck trailer 110 to the deployment location.

Figure 2:
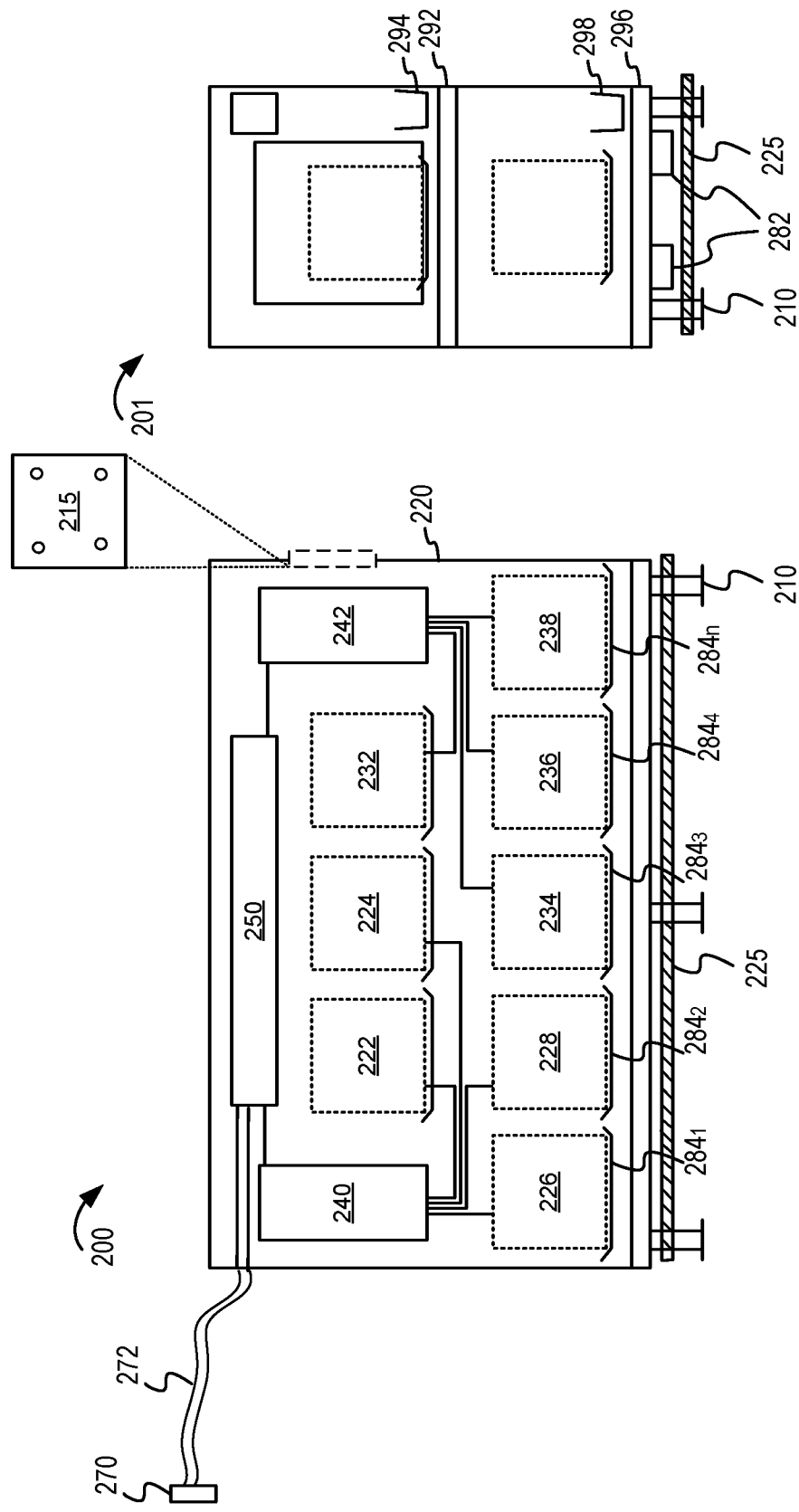
FIG. 2 depicts an example system diagram of a transportable battery charging station.

FIG. 2 depicts an example system diagram of a transportable battery charging station. FIG. 2 includes a front view 200 and a side view 201 of the transportable battery charging station. The transportable battery charging station includes a rack structure 220 for mounting and wiring the battery chargers 240, 242. The rack structure 220 may be tailored or constructed according to the intended use of the transportable battery charging station. For example, the rack structure 220 may be constructed to a specific size based on type or quantity of lead-acid batteries to be charged, type of battery chargers, or the like. Furthermore, the rack structure 220 may be sized based on trailer dimensions, such as to provide for clearance space in the trailer, optimal packing of multiple transportable battery charging stations within the trailer dimensions, or distribution of weight. The transportable battery charging station includes several battery stands (such as battery stands $284_1$-$284_n$) which are incorporated into the rack structure. A battery stand is a support structure configured to guide placement of a battery and/or temporarily secure the battery within the rack structure. In the front view 200, some of the components (such as the second shelf 292 and cable trays 294, 298) of the rack structure 220 are removed so that the charging cables can be shown. Each charging cables may be wired from a battery charger to a battery location represented by a battery stand. The charging cables may be free moving or fixed to the rack structure. In some implementations, the charging cables may have terminal adapters or other types of connectors for attaching to lead-acid batteries. A first battery charger 240 may have charging cables to four battery locations 222, 224, 226, 228. A second battery charger 242 may have charging cables to four other battery locations 232, 234, 236, 238. The example in FIG. 2 is provided for illustrative purposes. Different types and configurations of battery chargers may be possible. For example, different battery chargers may support a different quantity of battery locations. The positions of the battery chargers in the rack structure 220 may be different than shown in FIG. 2. Furthermore, the organization of the charging cables may be different in some implementations.

In some implementations, the transportable battery charging station may include a power distribution panel 250. In other implementations, the power distribution panel 250 may be incorporated into the truck trailer (not shown). The battery chargers 240, 242 may connect to the power distribution panel 250. A power input line 272 from the power distribution panel 250 (or directly from each of the first battery charger 240 and the second battery charger 242) may connect to a power source (such as a generator or power distribution system of the trailer, not shown). In some implementations, the power input line 272 may have a turn-locking plug 270 for connecting to a turn-locking receptacle at the trailer. The trailer may provide power distribution from the generator to each battery charger via one or more turn-locking receptacles at the trailer.

In some implementations, the transportable battery charging station may include a battery tray 225 to catch any water or other liquid spillover that may arise from or boil over from a battery. Battery tray 225 may be configured as a removable pan or tray, staged on the trailer and/or put into place after setup of the transportable battery charging station.

The transportable battery charging station includes a plate 215 attachment affixed to a side of a rack structure 220 that provides for attachment between rack structures to connect and/or secure multiple rack structures together in a given configuration. Plate 215 may have a plurality of openings configured to allow bolts or other securing features to pass through plate 215 into rack leg 210, securing plate 215 to rack leg 210 of rack structure 220.

The side view 201 shows a first shelf 296 and a second shelf 292 of the rack structure. Other quantities and configurations of shelves may be possible. Cable trays 294, 298 may be integrated with the rack structure to organize and declutter the power cables or charging cables used in the transportable battery charging station.

The rack structure 220 may be tailored or constructed for use in a transportation or distribution operation. For example, the rack structure 220 may be constructed with a stable base (rather than wheels or rollers) to provide stability and safety for use in an industrial area. The base may include multiple rack feet (such as rack foot 210). In some implementations, the rack feet may be constructed using the uprights of the rack structure. In some implementations, the rack feet may include base plates for additional stability. The rack structure may be constructed with a clearance space for the forks of a forklift (or a pallet jack) to maneuver under the rack structure to facilitate moving the transportable battery charging station. In some implementations, the rack structure may include fork tubes 282 to provide more stability when being moved by a forklift or pallet jack.

In some implementations, the transportable battery charging station may store or integrate a power cable spool. For example, the power cable spool may provide a sufficient length of power cable to connect the battery chargers 240, 242 (or the power distribution panel 250) to a power source or to a fixed connector on the trailer.

Figure 3:
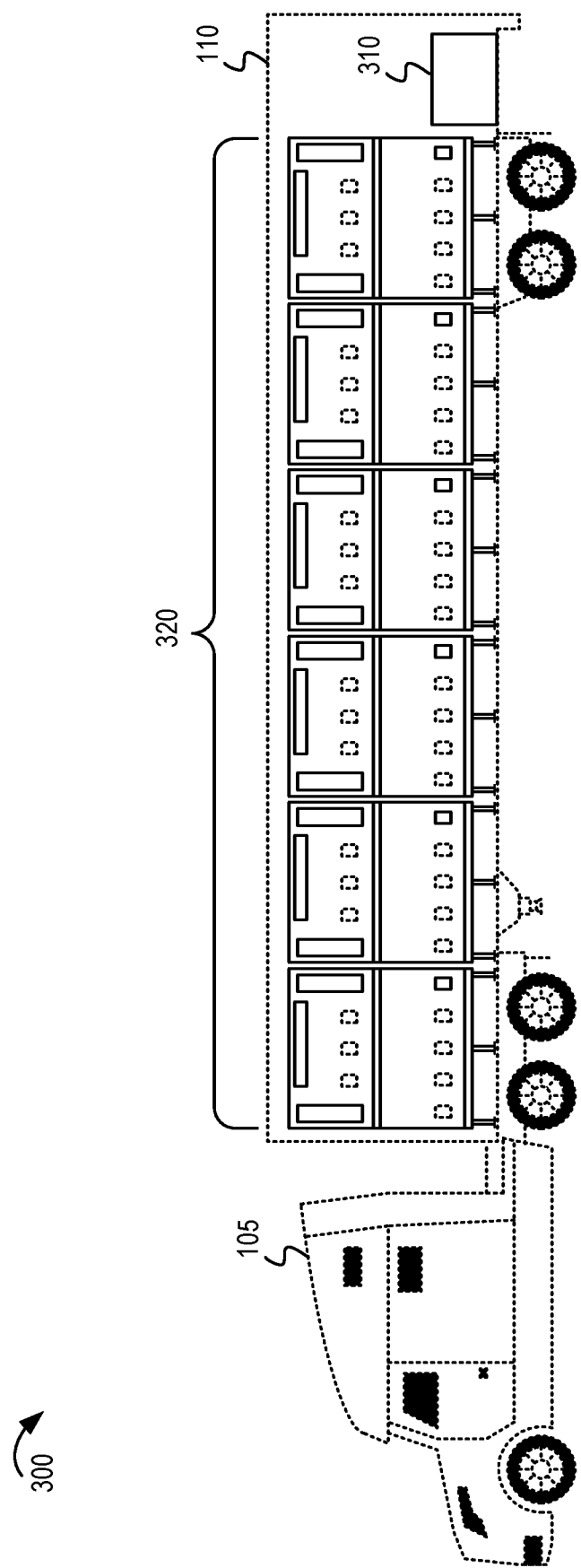
FIG. 3 depicts an example configuration for transporting multiple transportable battery charging stations.

FIG. 3 depicts an example configuration for transporting multiple transportable battery charging stations. The system 300 shows the truck 105 and truck trailer 110 as described in FIG. 1. For brevity, the first fixed connector 150, the second fixed connector 118, the cable management system 158 and the power cable 154 (any of which may be present in the truck trailer 110) are not shown in FIG. 3. FIG. 3 shows that multiple transportable battery charging stations 320 may be transported in the truck trailer 110. An ABP 310 also may be transported in the truck trailer 110. Depending on the width of the transportable battery charging stations 320, the trailer truck 110 may transport two (or more) transportable battery charging stations side by side along the length of the truck trailer 110.

In one example, the truck trailer 110 may transport ten transportable battery charging stations, and each transportable battery charging station may support concurrent charging of eight batteries. Thus, the truck trailer 110 may support the deployment of battery chargers to charge up to eighty batteries. Different types of transportable battery charging stations may be transported. For example, a first transportable battery charging station design may support 24-volt (24V) batteries (with an appropriately sized battery charger for 24V charging). A second transportable battery charging station design may support 36-volt (36V) batteries (with an appropriately sized battery charger for 36V charging). The truck trailer 110 may transport various quantities of the first transportable battery charging station and the second transportable battery charging station to provide various types of batteries used by a fleet of industrial vehicles at a deployment location.

In some implementations, the ABP 310 may be transported in the rear of the truck trailer 110 to provide easier access. For example, the ABP 310 may be maneuverable by a pallet jack or manual jack. This may be helpful so that the ABP 310 can be used to install a battery in a forklift that has previously lost power (such as due to an unusable fuel cell). Once the battery has been installed in the forklift, that forklift may be used to unload the transportable battery charging stations 320 or to change batteries in other forklifts. The example configuration in FIG. 3 is provided for illustrative purposes. Other configurations may be used depending on quantity of transportable battery charging stations, weight distribution, and/or deployment scenarios.

Figure 4:
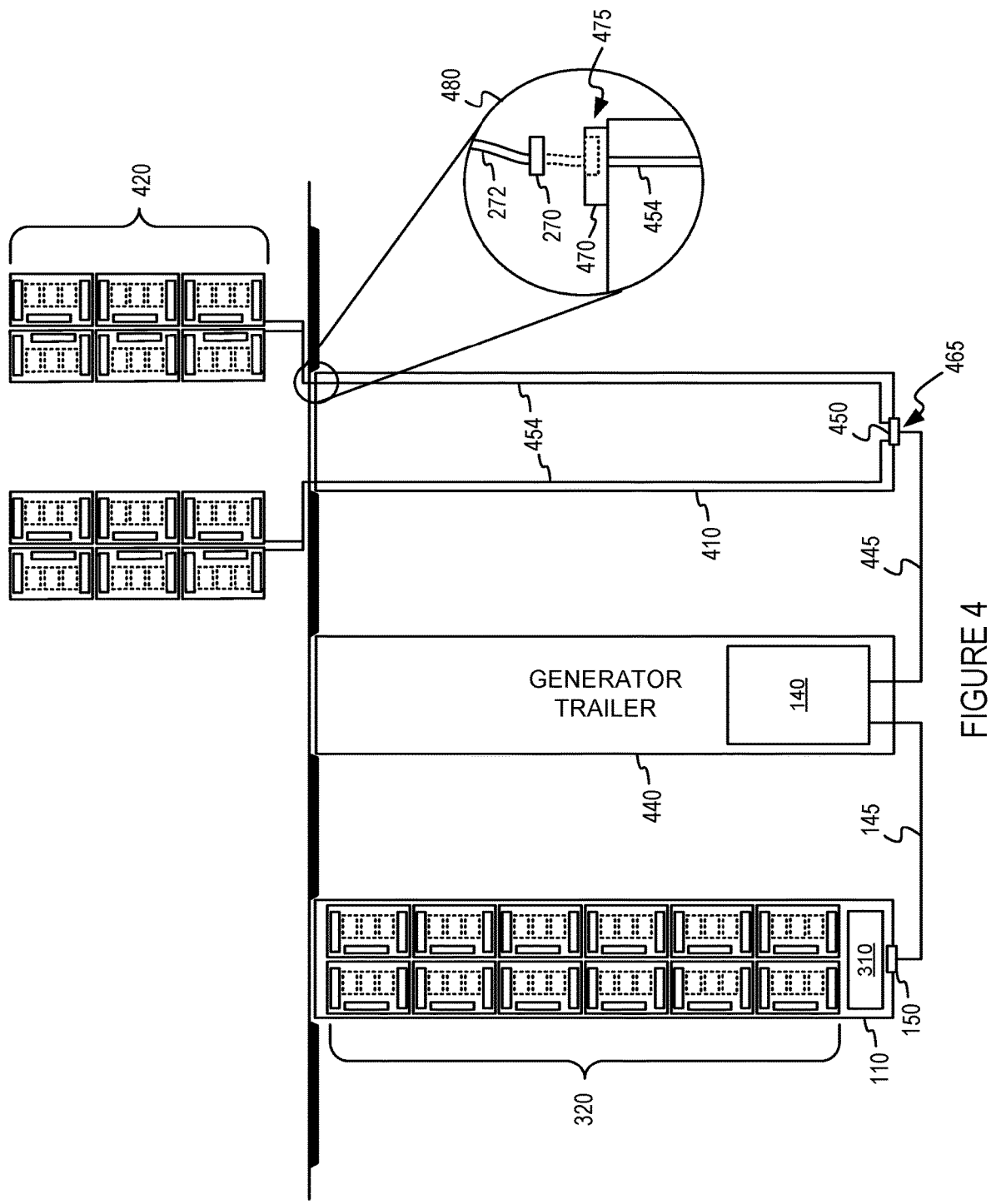
FIG. 4 depicts an example deployment of a contingency battery charging system.

FIG. 4 depicts an example deployment of a contingency battery charging system. The illustration 400 shows two trailers (a first trailer 110 and a second trailer 410) used to transport transportable battery charging stations to the deployment location. The trailers may be driven to dock locations at the deployment location. In FIG. 4, the first trailer 110 has multiple transportable battery charging stations 320 which have not yet been unloaded. The second trailer 410 transported multiple transportable battery charging stations 420 which have been unloaded and placed in a staging area in the deployment location.

A generator 140 also may be deployed to the deployment location. The generator may be transported in a generator trailer 440. Alternatively, the generator 140 may be transported on a flatbed trailer (not shown), other type of container, or may be a towable generator 140. The generator 140 may be deployed to the deployment location as part of a coordinated contingency plan. For example, the first trailer 110, the second trailer 410, and the generator trailer 440 may be delivered to the deployment location to provide contingency battery charging capability for a fleet of industrial vehicles. In yet another alternative, the generator 140 may be a standalone backup power system already at the deployment location.

In some deployments, the generator 140 may be placed in between the two trailers so that the generator 140 may provide power to both trailers using short distance power cables. For example, a first power cable 145 from the generator 140 may be connected to the first fixed connector 150 of the truck trailer 110. A second power cable 445 may be connected to a fixed connector 450 at the second trailer 410. For example, a turn-locking plug and receptacle may form a connection 465 between the second power cable 445 and a power distribution system of the second trailer 410. In some implementations, the fixed connector 450 may be protected by an amp breaker (not shown) in the second trailer 410. For example, a 600 Amp breaker may provide protection for power surges or overloading while providing sufficient power to the transportable battery charging stations 420 via power cables 454.

In the example of FIG. 4, the second trailer 410 has integrated power cable management system to wire the power cables 454 from the front of the trailer to the back of the trailer. At the back of the trailer, a fixed connector 470 (such as a turn-locking receptacle) may facilitate quick connection of power cables from the battery chargers in the transportable battery charging stations 420 to the power cables 454. A closeup view 480 shows on example fixed connector 470. A power input line 272 with a turn-locking plug 270 may be inserted (shown at 475) into the fixed connector 470). Although FIG. 4 shows the fixed connector 470 positioned at the rear of the trailer, in other implementations, the fixed connector 470 may be positioned elsewhere. For example, the fixed connector 470 may be positioned inside the trailer. For brevity, FIG. 4 shows one connector (the fixed connector 470) for a power input line 272 from one of the battery chargers. In some implementations, the trailer may incorporate multiple connectors (not shown) to facilitate quick connection of multiple battery chargers. By having the power cables located inside the trailer, floor space may be conserved, and the dock area may be safer for workers. A track system or barricade (not shown) may be used to organize the power cables between the transportable battery charging stations 420 and the second trailer 410.

Figure 5:
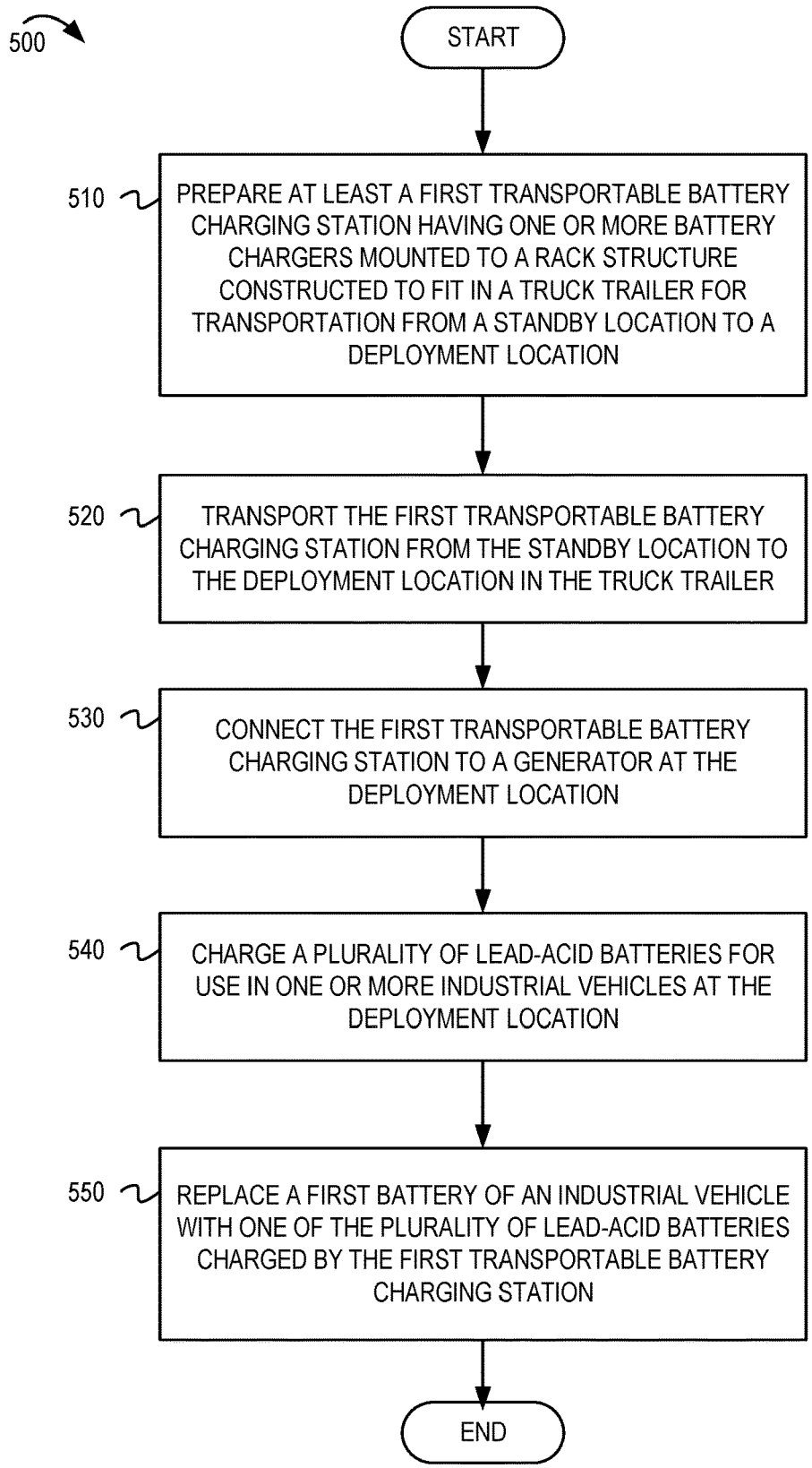
FIG. 5 depicts an example flowchart for using a transportable battery charging station.

FIG. 5 depicts an example flowchart for using a transportable battery charging station. The flowchart 500 begins at block 510. The flowchart 500 may be performed by one or more operators associated with a transportation and distribution operation.

At block 510, the operator may prepare at least a first transportable battery charging station having one or more battery chargers mounted to a rack structure constructed to fit in a truck trailer for transportation from a standby location to a deployment location. At block 520, the operator may transport the first transportable battery charging station from the standby location to the deployment location in the truck trailer.

At block 530, the operator may connect the first transportable battery charging station to a generator at the deployment location. For example, an operator may connect the generator to a first fixed connector of the truck trailer. The operator may connect the one or more battery chargers to a second fixed connector of the truck trailer. The truck trailer includes a power distribution system connecting the first fixed connector to the second fixed connector.

At block 540, the operator may charge a plurality of lead-acid batteries for use in one or more industrial vehicles at the deployment location. At block 550, the operator may replace a first battery of an industrial vehicle with one of the plurality of lead-acid batteries charged by the first transportable battery charging station.

Figure 6:
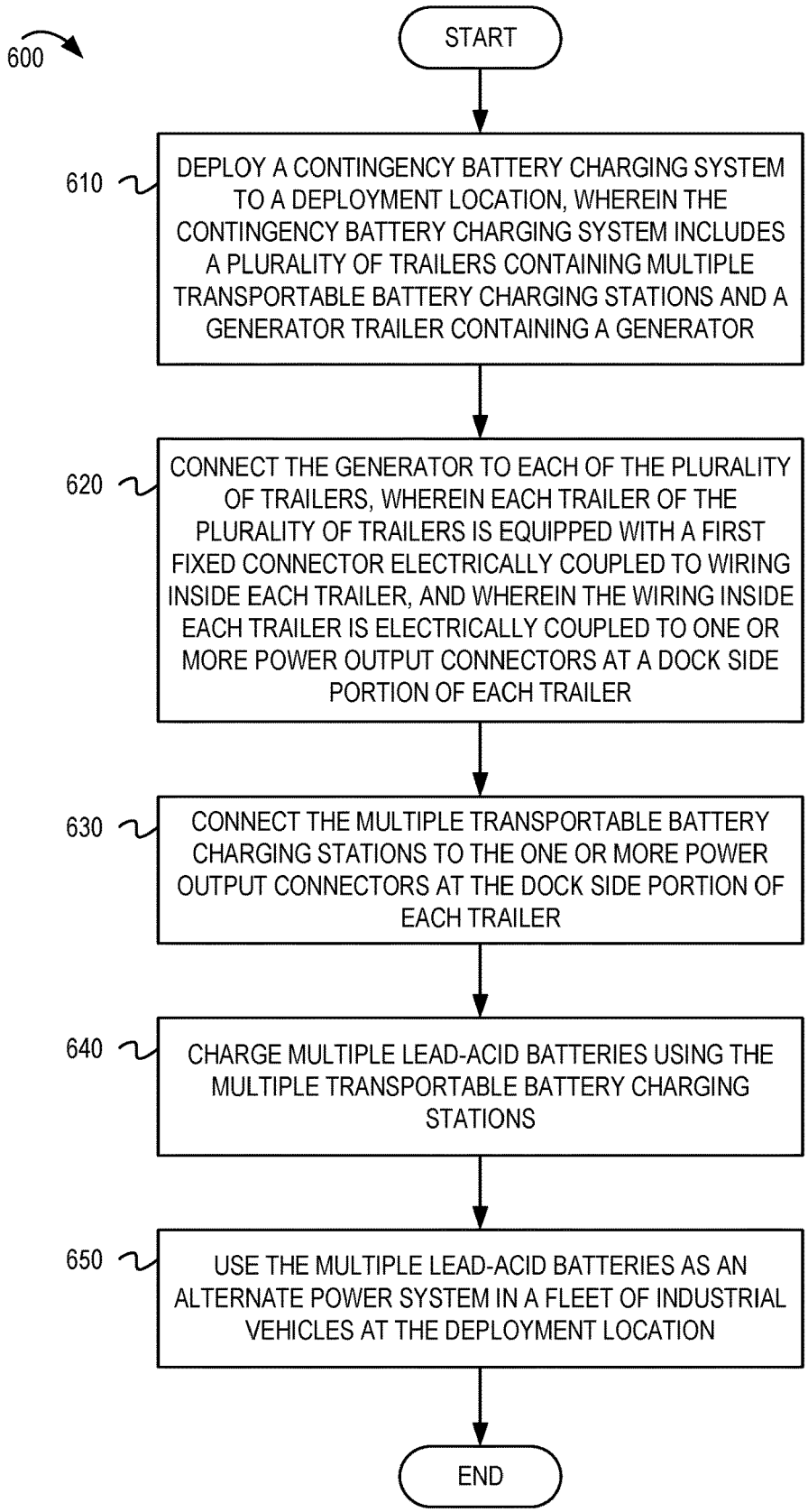
FIG. 6 depicts an example flowchart for deploying a contingency battery charging system.

FIG. 6 depicts an example flowchart for deploying a contingency battery charging system. The flowchart 600 begins at block 610. The flowchart 600 may be performed by one or more operators associated with a transportation and distribution operation.

At block 610, the operator may deploy a contingency battery charging system to a deployment location. The contingency battery charging system may include a plurality of trailers containing multiple transportable battery charging stations and a generator trailer containing a generator.

At block 620, the operator may connect the generator to each of the plurality of trailers. Each trailer of the plurality of trailers may be equipped with a first fixed connector electrically coupled to wiring inside each trailer. The wiring inside each trailer may be electrically coupled to one or more power output connectors at a dock side portion of each trailer. At block 630, the operator may connect the multiple transportable battery charging stations to the one or more power output connectors at the dock side portion of each trailer.

At block 640, the operator may charge multiple lead-acid batteries using the multiple transportable battery charging stations. At block 650, the operator may use the multiple lead-acid batteries as an alternate power system in a fleet of industrial vehicles at the deployment location.

Example Scenarios

Aspects of the disclosure enable various additional scenarios. For example, there may be different motivations or advantages associated with using a contingency battery charging system. In one example, air contamination in at an industrial location (such as a distribution center or warehouse) may temporarily cause hydrogen fuel cells to be unusable. The contingency battery charging system may be deployed to provide an alternate power system for a fleet of industrial vehicles until the air contamination can be resolved.

In another example, the supply chain of hydrogen fuel may be disrupted due to a natural disaster or a malicious attack. The contingency battery charging system may be deployed in response to the supply chain disruption. In another example, a predicted disruption (such as impending storm or predicted natural disaster) may prompt a precautionary deployment of the contingency battery charging system to proactively avoid downtime from hydrogen fuel shortage or power outages.

In some implementations, a fleet of trailers may deliver transportable battery charging stations and generators to a plurality of deployment locations. For example, a fleet of trailers may be maintained at a centrally-located standby location (or regional disaster planning locations). In response to an actual or predicted disruption to the supply of fuel (or power outage), a transportation and distribution operation may deploy transportable battery charging stations and generators to multiple deployment locations in an affected area.

While the aspects of the disclosure have been described in terms of various examples with their associated operations, a person skilled in the art would appreciate that a combination of operations from any number of different examples is also within the scope of the aspects of the disclosure.

Alternatively, or in addition to the other examples described herein, examples include any combination of the following:
  one or more battery chargers capable of charging a plurality of lead-acid batteries;
  a plurality of battery stands;
  a rack structure for mounting and wiring the one or more battery chargers to the plurality of battery stands, wherein the rack structure is constructed to fit in a transportation container or truck trailer for transportation from a standby location to a deployment location;
  wherein the rack structure is constructed with a stable base that forms a space for an industrial vehicle to lift and move the rack structure;
  at least one cable tray incorporated with the rack structure, the at least one cable tray for organizing power charging cables from a power source to the one or more battery chargers or from the one or more battery chargers to the plurality of battery stands;
  one or more fixed connectors for connecting a power source to the one or more battery chargers;
  at least one power distribution panel for distributing power from a power source to the one or more battery chargers;
  charging cables wired from the one or more battery chargers to the plurality of battery stands;
  one or more lead-acid batteries stowed on the plurality of battery stands in the rack structure;
  wherein the transportable battery charging station is capable of concurrently charging multiple lead-acid batteries;
  a first truck trailer for transportation of at least a first transportable battery charging station;
  the first transportable battery charging station having one or more battery chargers mounted to a rack structure constructed to fit in the first truck trailer for transportation from a standby location to a deployment location;
  at least a first fixed connector incorporated into the first truck trailer for connecting a power source to a power distribution system of the first truck trailer;
  at least a second fixed connector incorporated into the first truck trailer for connecting the power distribution system to the one or more battery chargers of the first transportable battery charging station;
  wherein the power source comprises an electric power generator;
  wherein the first fixed connector includes an exterior mounted turn-locking connector for connection to an electric power generator outside the first truck trailer;
  an amp breaker between the first fixed connector and the power distribution system of the first truck trailer;
  wherein the second fixed connector includes an exterior mounted turn-locking connector at a rear of the first truck trailer;
  one or more cable trays incorporated into an interior of the first truck trailer, the one or more cable trays capable of supporting electric cables running from the power distribution system to the one or more battery chargers;
  multiple transportable battery charging stations, wherein the multiple transportable battery charging stations are capable of concurrently charging multiple lead-acid batteries;
  a battery changing apparatus stowed in the first truck trailer, wherein the battery changing apparatus facilitates changing a battery in a first industrial vehicle with a lead-acid battery charged by the first transportable battery charging station;
  wherein the battery changing apparatus comprises an adapter that attaches to a second industrial vehicle that is used to change the battery in the first industrial vehicle;
  a second truck trailer for transportation of additional transportable battery charging stations;
  a plurality of trailers for transporting multiple transportable battery charging stations from a standby location to a deployment location, wherein each trailer of the plurality of trailers is equipped with a first fixed connector electrically coupled to wiring inside each trailer, and wherein the wiring inside each trailer is electrically coupled to one or more power output connectors at a dock side portion of each trailer;
  the multiple transportable battery charging stations, each transportable battery charging station having one or more battery chargers and a plurality of battery stands mounted to a rack structure, the one or more battery chargers capable of charging lead-acid batteries;

a generator trailer for transporting a generator from the standby location to the deployment location;

power cables to connect the generator to the first fixed connector on each trailer of the plurality of trailers;

power cables to connect the multiple transportable battery charging stations to the second fixed connector on each trailer of the plurality of trailers;

charging cables to connect the lead-acid batteries to the one or more battery chargers;

a battery puller adapter configured to facilitate changing fuel cells in a fleet of industrial vehicles with the lead-acid batteries;

multiple lead-acid batteries for use in the fleet of industrial vehicles, wherein the multiple lead-acid batteries are transported to the deployment location in one or more of the following: the plurality of trailers, the generator trailer, another trailer, or a transportation vehicle;

preparing at least a first transportable battery charging station having one or more battery chargers mounted to a rack structure constructed to fit in a truck trailer for transportation from a standby location to a deployment location;

transporting the first transportable battery charging station from the standby location to the deployment location in the truck trailer;

connecting the first transportable battery charging station to a generator at the deployment location;

charging a plurality of lead-acid batteries for use in one or more industrial vehicles at the deployment location;

replacing a first battery of an industrial vehicle with one of the plurality of lead-acid batteries charged by the first transportable battery charging station;

connecting the generator to a first fixed connector of the truck trailer;

connecting the one or more battery chargers to a second fixed connector of the truck trailer, wherein the truck trailer includes a power distribution system connecting the first fixed connector to the second fixed connector;

deploying a contingency battery charging system to a deployment location, wherein the contingency battery charging system includes a plurality of trailers containing multiple transportable battery charging stations and a generator trailer containing a generator;

connecting the generator to each of the plurality of trailers, wherein each trailer of the plurality of trailers is equipped with a first fixed connector electrically coupled to wiring inside each trailer, and wherein the wiring inside each trailer is electrically coupled to one or more power output connectors at a dock side portion of each trailer;

connecting the multiple transportable battery charging stations to the one or more power output connectors at the dock side portion of each trailer;

charging multiple lead-acid batteries using the multiple transportable battery charging stations; and using the multiple lead-acid batteries as an alternate power system in a fleet of industrial vehicles at the deployment location.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A transportable battery charging station, comprising:
one or more battery chargers capable of charging a plurality of lead-acid batteries;
a transportation container configured for transport from a standby location to a deployment location, the transportation container including one or more fixed connectors for connecting a transportable power source to the one or more battery chargers, wherein at least one fixed connector includes an exterior mounted turn-locking connector for connection to an electric power generator;
a plurality of battery stands; and
a rack structure for mounting and wiring the one or more battery chargers to the plurality of battery stands, wherein the rack structure is constructed to fit in the transportation container.

2. The transportable battery charging station of claim 1, wherein the rack structure is constructed with a stable base that forms a space for an industrial vehicle to lift and move the rack structure.

3. The transportable battery charging station of claim 1, further comprising:

at least one cable tray incorporated with the rack structure, the at least one cable tray for organizing power charging cables from a power source to the one or more battery chargers or from the one or more battery chargers to the plurality of battery stands.

4. The transportable battery charging station of claim 1, further comprising:
at least one power distribution panel for distributing power from a power source to the one or more battery chargers.

5. The transportable battery charging station of claim 1, further comprising:
charging cables wired from the one or more battery chargers to the plurality of battery stands.

6. The transportable battery charging station of claim 1, further comprising:
one or more lead-acid batteries stowed on the plurality of battery stands in the rack structure.

7. The transportable battery charging station of claim 1, wherein the transportable battery charging station is capable of concurrently charging multiple lead-acid batteries.

8. A system for providing contingency battery power, the system comprising:
a first truck trailer for transportation of at least a first transportable battery charging station;
the first transportable battery charging station having one or more battery chargers mounted to a rack structure constructed to fit in the first truck trailer for transportation from a standby location to a deployment location;
at least a first fixed connector incorporated into the first truck trailer for connecting a power source to a power distribution system of the first truck trailer, wherein the first fixed connector includes an exterior mounted turn-locking connector for connection to an electric power generator outside the first truck trailer; and
at least a second fixed connector incorporated into the first truck trailer for connecting the power distribution system to the one or more battery chargers of the first transportable battery charging station.

9. The system of claim 8, wherein the power source comprises an electric power generator.

10. The system of claim 8, further comprising:
an amp breaker between the first fixed connector and the power distribution system of the first truck trailer.

11. The system of claim 8, wherein the second fixed connector includes an exterior mounted turn-locking connector at a rear of the first truck trailer.

12. The system of claim 8, further comprising:
one or more cable trays incorporated into an interior of the first truck trailer, the one or more cable trays capable of supporting electric cables running from the power distribution system to the one or more battery chargers.

13. The system of claim 8, further comprising
multiple transportable battery charging stations, wherein the multiple transportable battery charging stations are capable of concurrently charging multiple lead-acid batteries.

14. The system of claim 8, further comprising:
a battery changing apparatus stowed in the first truck trailer, wherein the battery changing apparatus facilitates changing a battery in a first industrial vehicle with a lead-acid battery charged by the first transportable battery charging station.

15. The system of claim 14, wherein the battery changing apparatus comprises an adapter that attaches to a second industrial vehicle that is used to change the battery in the first industrial vehicle.

16. The system of claim 8, further comprising:
a second truck trailer for transportation of additional transportable battery charging stations.

17. A contingency battery charging system, comprising:
a plurality of trailers for transporting multiple transportable battery charging stations from a standby location to a deployment location, wherein each trailer of the plurality of trailers is equipped with a first fixed connector electrically coupled to wiring inside each trailer, and wherein the wiring inside each trailer is electrically coupled to one or more power output connectors at a dock side portion of each trailer;
the multiple transportable battery charging stations, each transportable battery charging station having one or more battery chargers and a plurality of battery stands mounted to a rack structure, the one or more battery chargers capable of charging lead-acid batteries;
a generator trailer for transporting a generator from the standby location to the deployment location;
power cables to connect the generator to the first fixed connector on each trailer of the plurality of trailers;
power cables to connect the multiple transportable battery charging stations to the second fixed connector on each trailer of the plurality of trailers;
charging cables to connect the lead-acid batteries to the one or more battery chargers; and
a battery puller adapter configured to facilitate changing fuel cells in a fleet of industrial vehicles with the lead-acid batteries.

18. The contingency battery charging system of claim 17, further comprising:
multiple lead-acid batteries for use in the fleet of industrial vehicles, wherein the multiple lead-acid batteries are transported to the deployment location in one or more of the following: the plurality of trailers, the generator trailer, another trailer, or a transportation vehicle.

* * * * *